United States Patent
Browne et al.

(10) Patent No.: US 6,641,166 B2
(45) Date of Patent: Nov. 4, 2003

(54) EXTENDABLE AND RETRACTABLE KNEE BOLSTER SYSTEM

(75) Inventors: Alan Lampe Browne, Grosse Pointe, MI (US); Gary Lee Jones, Farmington Hills, MI (US); Joseph D. McCleary, Clinton Township, MI (US); William E. Thomas, West Bloomfield, MI (US); Jenne-Tai Wang, Troy, MI (US); Scott R. Webb, Macomb Township, MI (US); Francis D. Wood, Detroit, MI (US); Chandra Sekhar Namuduri, Troy, MI (US)

(73) Assignee: General Motors Corporation, Detroit, MI (US)

(*) Notice: Subject to any disclaimer, the term of this patent is extended or adjusted under 35 U.S.C. 154(b) by 62 days.

(21) Appl. No.: 09/864,353

(22) Filed: May 25, 2001

(65) Prior Publication Data

US 2003/0001372 A1 Jan. 2, 2003

(51) Int. Cl.[7] ............................................. B60R 21/045
(52) U.S. Cl. ....................................... 280/752; 280/753
(58) Field of Search ................................ 280/751, 748, 280/752, 753; 180/271, 274, 282; 296/35.2; 701/45

(56) References Cited

U.S. PATENT DOCUMENTS

| | | | | |
|---|---|---|---|---|
| 3,938,825 A | * | 2/1976 | Boswell | 280/753 |
| 4,951,963 A | * | 8/1990 | Behr et al. | 280/753 |
| 5,496,066 A | * | 3/1996 | Hoffmann et al. | 280/753 |
| 5,615,914 A | * | 4/1997 | Galbraith et al. | 280/743.1 |
| 5,725,267 A | * | 3/1998 | Grosser et al. | 293/133 |
| 5,967,573 A | * | 10/1999 | Wang | 293/119 |
| 6,213,506 B1 | * | 4/2001 | Swann et al. | 280/751 |
| 6,244,625 B1 | * | 6/2001 | Bayer et al. | 280/751 |
| 6,283,508 B1 | * | 9/2001 | Nouwynck et al. | 280/753 |
| 6,302,458 B1 | * | 10/2001 | Wang et al. | 293/132 |
| 6,340,170 B1 | * | 1/2002 | Davis et al. | 280/730.1 |

OTHER PUBLICATIONS

U.S. patent application Ser. No. 09/702,138, Wang et al., filed Oct. 31, 2000.

* cited by examiner

Primary Examiner—Paul N. Dickson
Assistant Examiner—Laura B. Rosey
(74) Attorney, Agent, or Firm—Kathryn A. Marra

(57) ABSTRACT

A knee bolster system is capable of automatic extension and retraction during specified scenarios that are determined based on sensor input. A microprocessor electrically controls an actuator capable of extending at least one telescoping mechanism which is rigidly engaged to a knee bolster pad located in the lower portion of an instrument panel at knee height to an occupant. Each telescoping mechanism houses a plowing mechanism. This plowing mechanism generates reaction forces during actuation.

16 Claims, 10 Drawing Sheets

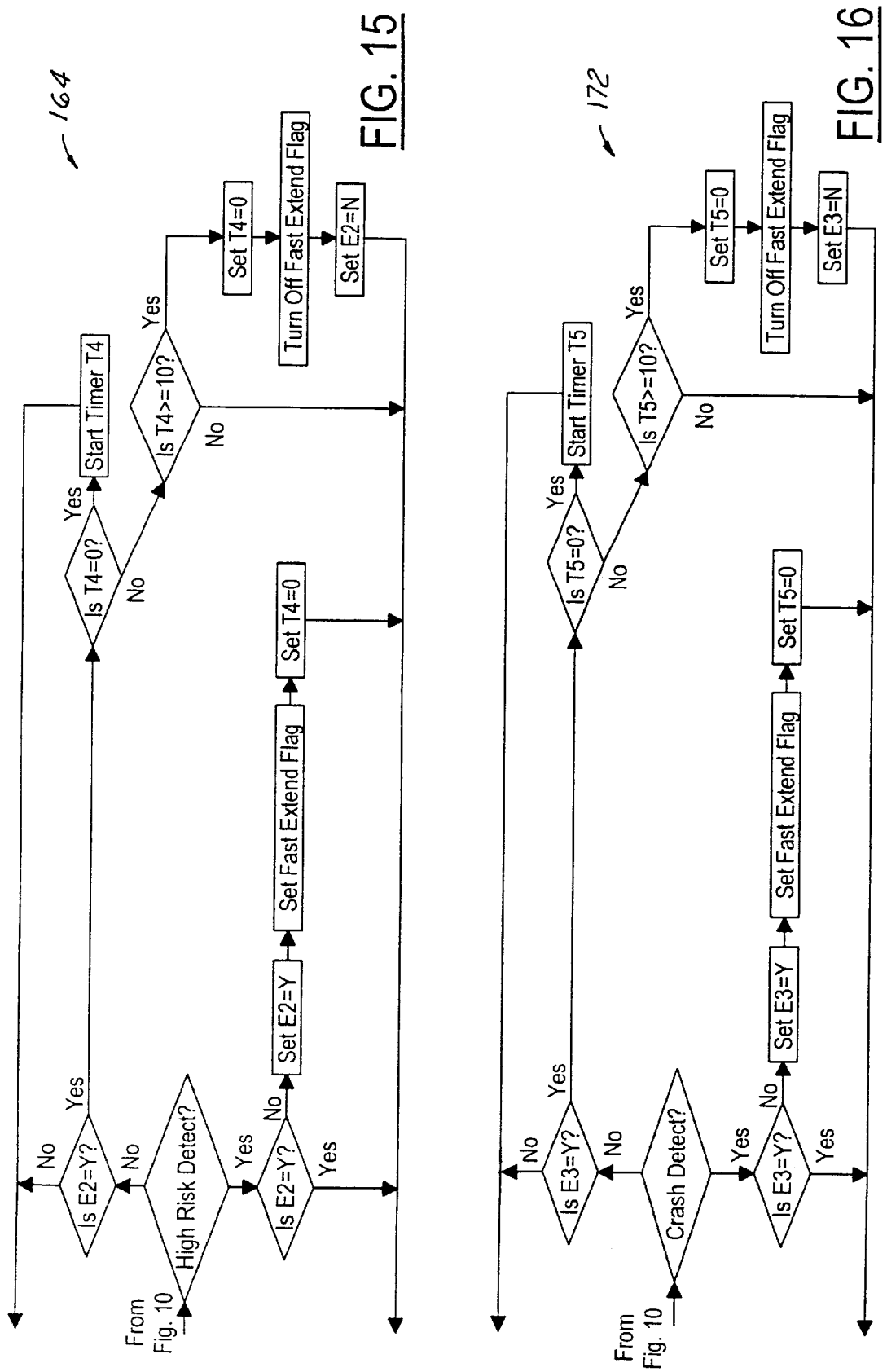

EXTENDABLE AND RETRACTABLE KNEE BOLSTER SYSTEM

TECHNICAL FIELD

The present invention relates to a knee bolster system and more particularly to an extendable and retractable knee bolster system, including its control logic, with an impact pre-sensing system for an automotive vehicle.

BACKGROUND OF THE INVENTION

The fixed fore-aft location of a knee bolster may constrain how far the lower portion of the instrument panel can be placed forward and away from the knees of an occupant. This constraint can limit comfort for the occupant. The position of current fixed-in place knee bolster systems is also a constraint on interior spaciousness. It is known that utilization of inflatable knee bolster systems brings the location of the lower portion of the instrument panel rearward when preferred. However, such crash triggered inflatable knee bolster systems do not typically retract automatically, and could require complete replacement after actuation. Such replacement is expensive, a cost borne by the consumer.

SUMMARY OF THE INVENTION

In accordance with the present invention, there is provided an extendable and retractable knee bolster system generally positioned in the lower portion of the instrument panel of a vehicle at knee height to an occupant. The knee bolster system has at least one and preferably two telescoping mechanisms secured to a bolster pad. The telescoping mechanism has an outer tube securing rigidly to the vehicle structure at a base end. The outer tube concentrically supports an inner tube capable of linear telescoping movement. The inner tube has a leading end secured to the bolster pad and a trailing portion engaged to a shuttle which operatively connects to a drive device via a rotating screw disposed concentrically within the inner and outer tubes.

The drive device rotates the screw which is engaged threadably to the shuttle. The shuttle thereby moves or extends the inner tube through a free end of the outer tube. The shuttle comprises part of a plowing mechanism which can help dissipate the energy. Preferably, the plowing mechanism has at least one axially extending groove defined by an outer cylindrical surface of the inner tube and facing an inner cylindrical surface of the outer tube. The groove has a trailing deep end and a leading shallow end. A sphere resides in the deep end and is restricted there during normal extending and retracting motions of the knee bolster pad by a plurality of radially extending fingers engaged to the shuttle. During an impact on the bolster pad, the sphere is thrust into the shallow end and plows into the inner surface of the outer tube causing deformation of the outer tube. The kinetic energy from the impact upon the bolster pad is absorbed into the telescoping mechanism. Examples of ways in which this energy could be absorbed are plowing of the balls and deformation of the tubes.

Preferably, the knee bolster system is actuated or controlled by a microprocessor which electrically communicates primarily with a plurality of risk sensors and a plurality of imminent impact sensors, and secondarily with a plurality of impact occurrence sensors. By using the outputs of risk sensors and imminent impact sensors as the primary means of triggering deployment, deployment times in the tenths of a second for the extendable/retractable knee bolster invented here rather than thousandths of a second required for impact triggered systems that have been proposed by others are tolerable in some applications. If a fully robust pre-impact sensor is not available, the bolster will automatically extend to the current mandated bolster location if the occupant is unbelted and the car placed in gear. The knee bolster pad will automatically retract if the ignition is off or the transmission is not in gear. In addition, the bolster pad will automatically retract if output signals or setpoints which caused the initial extension are cleared.

An advantage of the present invention is that through the use of continuous monitoring and forecasting, the knee bolster is able to be stored further from the occupant in so doing permitting a more spacious vehicle interior.

Another advantage of the present invention is the automatic retraction capability thereby minimizing maintenance costs.

An additional advantage of this invention is the enhancement of vehicle entry and egress, since the bolster is stowed when the vehicle is not in gear.

BRIEF DESCRIPTION OF THE DRAWINGS

Preferred exemplary embodiments of the present invention hereinafter shall be described in conjunction with the impending drawings, wherein like numerals denote like elements and wherein:

FIG. 15 is a functional flow chart of a side radar subroutine of the crash pre-sensing system found in FIG. 10;

FIG. 16 is a functional flow chart of a side crash sensor subroutine of FIG. 10;

DESCRIPTION OF THE PREFERRED EMBODIMENT

Figure 1:
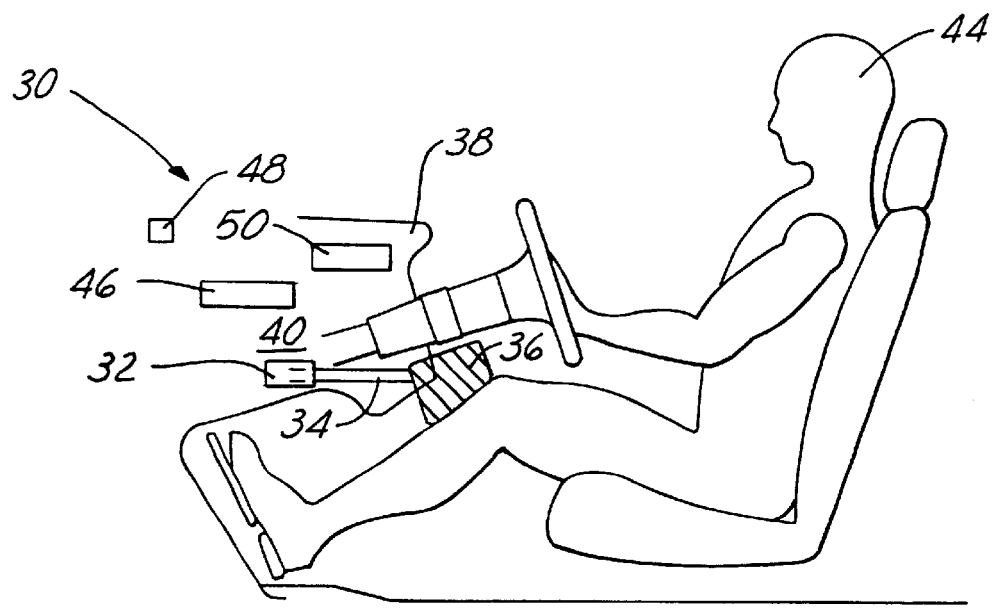
FIG. 1 is a side view of a knee bolster system within a vehicle environment of the present invention.
Figure 2:
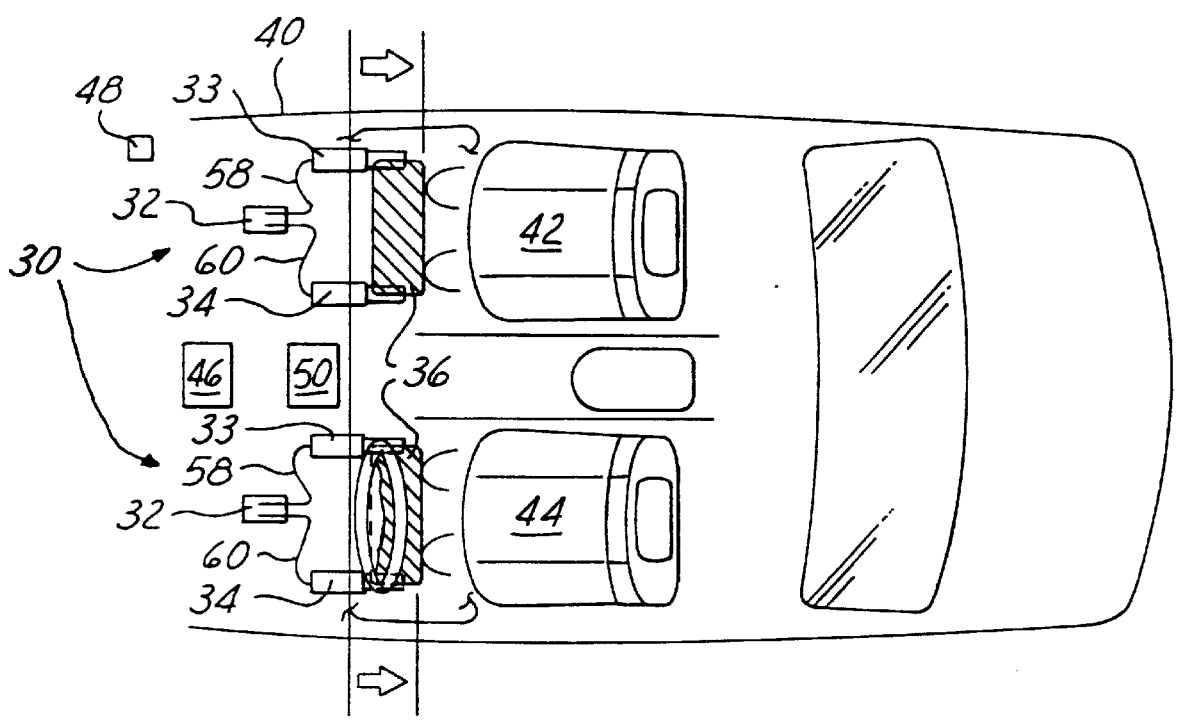
FIG. 2 is a top plane view illustrating two knee bolster systems within the vehicle environment.
Figure 3:
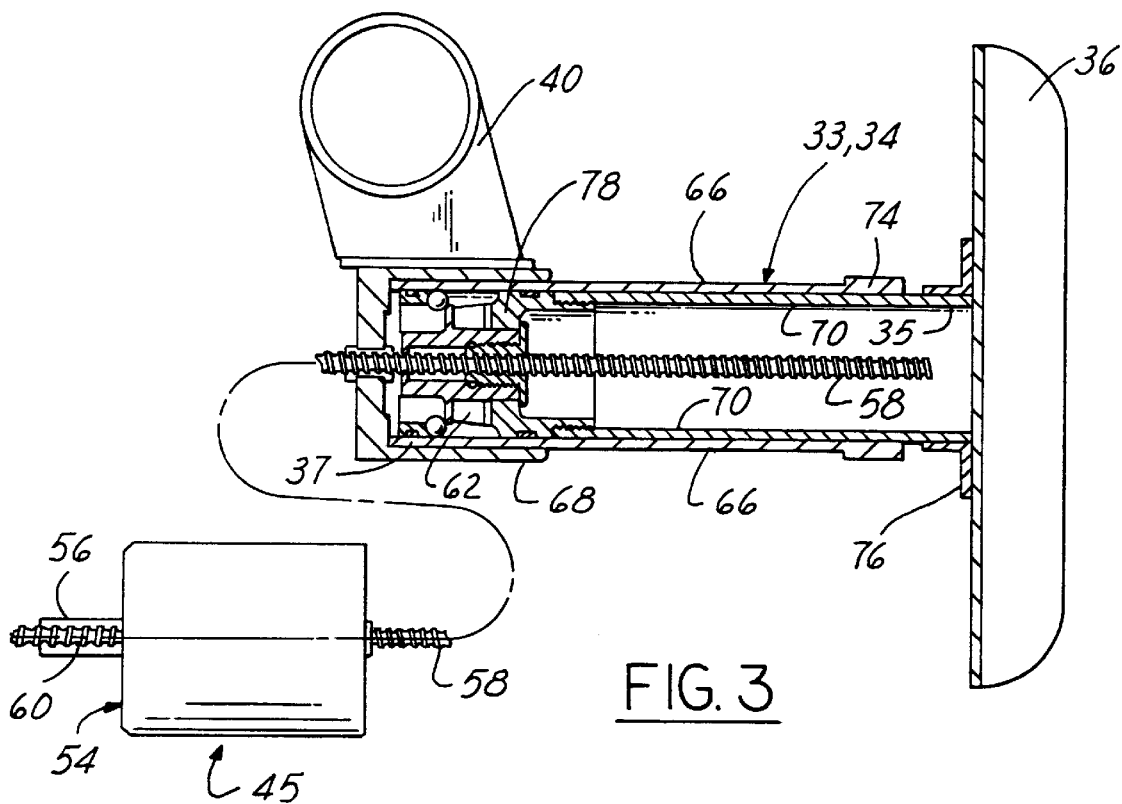
FIG. 3 is a partial cross-sectional longitudinal view of the knee bolster system.

Referring to FIGS. 1, 2 and 3, the knee bolster system 30 includes an actuator 32 connecting operatively to at least one and preferably two telescoping mechanisms 33, 34. The telescoping mechanisms 33, 34 each have a leading end 35 attached to a singular or common elongated knee bolster pad 36, and a base end 37 attached to a vehicle structure 40. The knee bolster system 30 generally mounts to the vehicle structure 40 within the lower portion of the dash 38. A leading surface of the knee bolster pad 36 can be a visual or aesthetically pleasing lower part of the dash 38. Two knee bolster systems 30 are preferably utilized within a single vehicle, one for a passenger 42 and one for a driver 44.

A microprocessor 46 receives the necessary input signals from a variety of external impact indication sensors 48, and extends the bolster pad 36 when preset limits are reached during certain risk scenarios or actual vehicle impact scenarios. In addition, the microprocessor 46 will initiate a signal to retract the bolster pad 36 after the reasons to extend are alleviated and pre-set delay times have expired. An optional and preferable impact pre-sensing system 50 also communicates with the microprocessor 46. The pre-impact sensing system 50 receives input signals from sensors which preferably utilize radar to detect the relative speed and distance of approaching objects, thereby forecasting imminent vehicle impact scenarios. Once any one of the sensor output limits are reached, the microprocessor 46 processes an "extend flag" signal causing the actuator 32 to extend the knee bolster pad 36. When the knee bolster system 30 actuates upon 'extend flag' initiation(s) within the control logic of the microprocessor 46, the actuator 32 actuates, the first and second telescoping mechanisms 33, 34 simultaneously extend, and the knee bolster pad 36 projects substantially horizontally toward the knees of the occupants, passenger 42 or driver 44.

Referring to FIGS. 2 and 3, the actuator 32 has a drive device 45, which may be powered pneumatically or electromagnetically, but is preferably an electric dual drive motor 54 having a dual ended rotor 56. A first end of rotor 56 engages with a first screw cable 58 and a second end of the rotor 56 engages a second screw cable 60 of the actuator 32. The first and second screw cables 58, 60 are reverse or counter threaded and extend centrally within the respective first and second telescoping mechanisms 33, 34. The first telescoping mechanism 33 substantially parallels the second telescoping mechanism 34. In order to equalize and minimize cable rotation resistance within the first and second screw cables 58, 60, the rotor 56 of the motor 54 is preferably disposed perpendicular to the longitude of the first and second telescoping mechanisms 33, 34. However, the flexibility of the left and right screw cables 58, 60 will enable any orientation of the motor 54 relative to the telescoping mechanisms 33, 34.

Preferably, the left and right screw cables 58, 60 each have a rigid screw portion disposed concentrically and extended longitudinally within the respective telescoping mechanisms 33, 34. First and second shuttles 62, 64 are engaged threadably to and are concentric with the rigid portions of the first and second screw cables 58, 60 from within the respective telescoping mechanisms 33, 34. The first shuttle 62 is therefore reverse threaded relative to the second shuttle 64. The first shuttle 62 engages the leading end 35 of the first telescoping mechanism 33 and the second shuttle 64 engages the leading end 35 of the second telescoping mechanism 34. The counter-rotation of the first and second screw cables 58, 60 cause the first and second shuttles 62, 64 to translate linearly up and down the longitudinal length of the first and second screw cables 58, 60, thereby causing the telescoping mechanisms 33, 34 to move longitudinally between a retracted position 65, see FIGS. 3 and 4, and an extended position 67, see FIG. 6.

Figure 4:
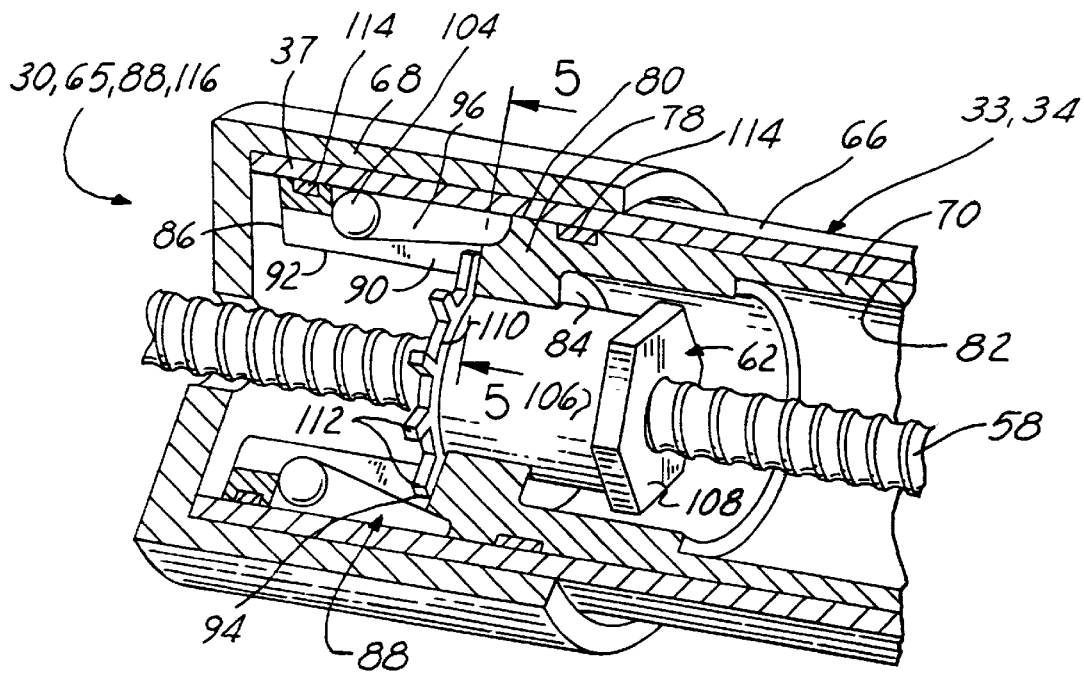
FIG. 4 is a partial broken away view of a telescoping mechanism shown in an initial powered extending state.
Figure 6:
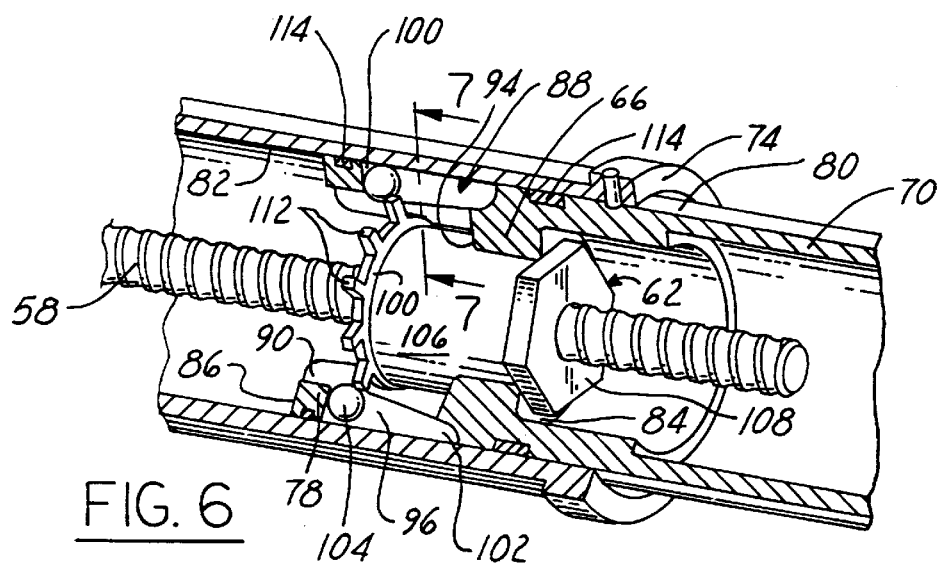
FIG. 6 is a partial broken away view of the telescoping mechanism shown in an initial powered retracting state.

Referring to FIGS. 3, 4 and 6, the base end 37 is part of an outer tube 66 of the telescoping mechanism 33, 34 and rigidly attaches to the vehicle structure 40 via a tubular boss 68. The outer tube 66 slideably and concentrically supports from within an inner tube 70. The leading end 35 is part of the inner tube 70 which protrudes outward through a free end 74 of the outer tube 66. The leading end 35 interconnects to the bolster pad 36 by a bracket 76.

A trailing portion 78 of the inner tube 70 engages the shuttle 62, 64. Trailing portion 78 has an outer cylindrical face 80 having a circumference or diameter equal to or slightly less than the circumference or diameter of an inner cylindrical face 82 of the outer tube 66. From the outer cylindrical face 80, the trailing portion 78 extends radially inward, forming at the axial ends an annular leading surface 84 and an annular trailing surface 86 or the trailing portion of the inner tube 70. The outer cylindrical face 80 extends axially between and substantially perpendicular to the leading surface 84 and the trailing surface 86. The trailing portion 78 is disposed concentrically to and substantially radially outward from the shuttle 62, 64.

Referring to FIGS. 4–7, the interaction between the shuttle 62, 64, the trailing portion 78 of the inner tube 70, and the inner cylindrical face 82 of the outer tube 66 function as a plowing mechanism 88 which deforms the outer tube 66 when a force brought on by the forward motion of the knees of an occupant 42, 44 impacts the bolster pad 36. Mechanism 88 has a plurality of crevices 90 formed into the trailing portion 78, and communicating longitudinally through a radial inner face 92 and radially through the trailing end surface 86 of the trailing portion 78. Each crevice 90 extends forwardly from the trailing end surface 86 to a contact end surface 94.

An elongated tapered groove 96 forms axially into the trailing portion 78 through the outer cylindrical face 80. Groove 96 communicates and aligns circumferentially with, and radially inward from each crevice 90. A deep end 100 of groove 96 trails and tapers radially outward to a shallow end 102. A sphere 104 of the plowing mechanism 88, preferably metallic and of a harder material than the outer tube 66, resides in the deep end 100 of the groove 96. The diameter of the sphere 104 is equal to or slightly less than the depth of the groove 96 at the deep end 100.

A tubular mid portion 106 of shuttle 62, 64 forms axially between and radially inward of a hex shaped forward stop member 108 and a rearward stop member 110. The axial length of the tubular mid portion 106 substantially equals the length of the groove 96 minus the diameter of the sphere 104. Extending radially outward from the rearward stop member 110 is at least one and preferably a plurality of fingers 112. Each finger 112 extends into the respective crevice 90. The finger 112 generally aligns axially between the deep end 100 and the shallow end 102 of the groove 96. Furthermore, finger 112 extends radially into the deep end 100, but falls short of extending into the shallow end 102. The axial length of the tubular mid portion 106 permits full axial translation or movement of the finger 112 within the groove 96 from the sphere 104 to the shallow end 102.

To minimize friction within the telescoping mechanism 34 when extending and retracting, at least one bearing ring 114 extends circumferentially and is disposed between the inner face 82 of the outer tube 66 and the outer face 80 of the inner tube 70. Preferably, one ring 114 seats slightly axially rearward of the deep end 100 and another ring 114 seats just forward of the shallow end 102 of the groove 96 within the trailing portion 78.

Motor Driven Extending State

Figure 5:
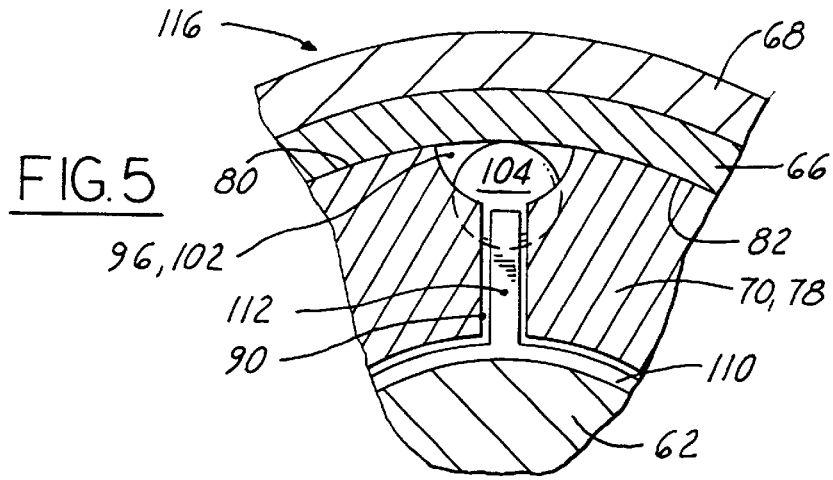
FIG. 5 is a cross sectional view of the telescoping mechanism taken along line 5—5 viewing in the direction of the arrows of FIG. 4.

Referring to FIGS. 4 and 5, when the knee bolster system 30 is in a motor driven extending state 116 the shuttle 62, 64 is advancing forward. The fingers 112 also advance forward within the respective crevice 90 until the fingers 112 contact or engage the contact end surface 94. The sphere 104 remains in the deep end 100 of groove 96. With engagement of the fingers 112 to the contact end surface 94, the trailing portion 78 of the inner tube 70 is pushed in the forward or extended direction. This extension continues until either the first and second screw cables 58, 60 cease rotating, or the knees of an unbelted passenger 42 or driver 44 impact the bolster pad 36 and in so doing engaging the plowing mechanism 88.

Motor Driven Retracting State

Figure 7:
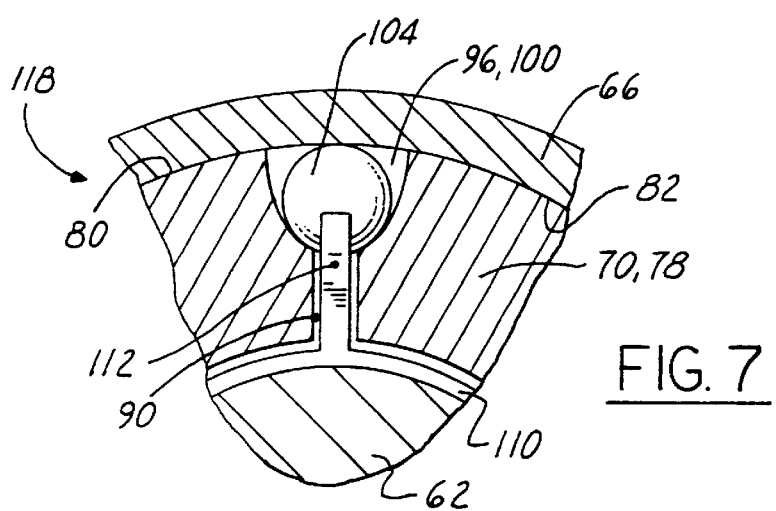
FIG. 7 is a cross sectional view of the telescoping mechanism taken along line 7—7 viewing in the direction of the arrows of FIG. 6.

Referring to FIGS. 6 and 7, when the knee bolster system 30 is in a motor driven retracting state 118, the shuttle 62, 64 is retracting in a rearward direction. As in the extending state 116 the sphere 104 remains in the deep end 100 of the groove 96, but unlike the extending state 116, the sphere 104 remains in the deep end 100 due to sphere 104 contact with the finger 112. During initial motored retraction 118 after extension, the finger 112 which was once in contact with the contact end surface 94 now moves axially rearward within the crevice 90 until the lip 108 of the shuttle 62, 64 engages the leading surface 84 of the trailing portion 78. With continuing rotation of the first screw cable 58 or second screw cable 60, the inner tube 70 begins retracting. The finger 112 resides forward of and contacts the sphere 104 prior to the inner tube 70 moving with respect to the outer tube 66, thereby preventing the sphere 104 from moving forward into the shallow end 102 of the groove 96. This finger obstruction assures that the plowing mechanism 88 does not engage. In other words the finger 112 assures that the sphere 104 will not enter the shallow end 102 and wedge between the outer tube 66 and the inner tube 70. Retraction of the inner tube 70 will cease when the motor 54 is deenergized or the inner tube is in the fully retracted position.

Plowing Mechanism Engagement State

Figure 8:
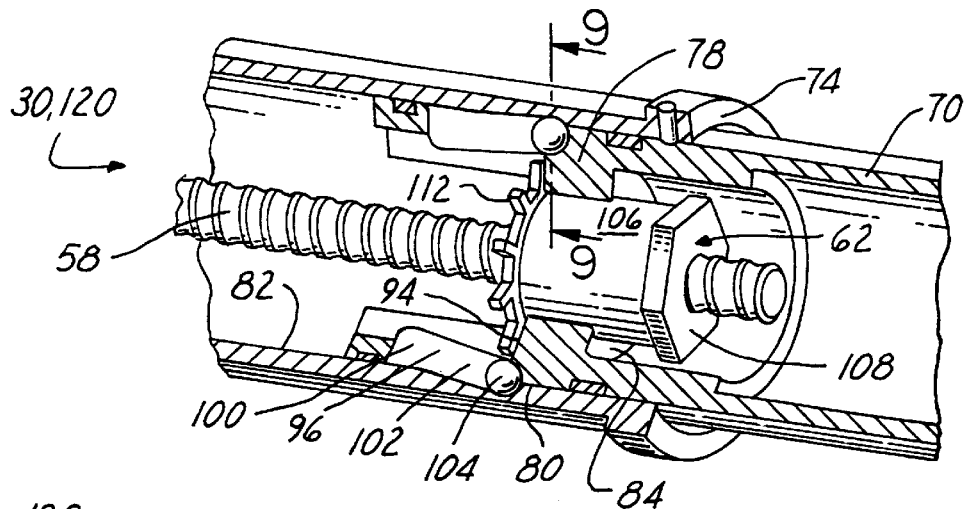
FIG. 8 is a partial broken away view of the telescoping mechanism shown with an impact absorber portion engaged.
Figure 9:
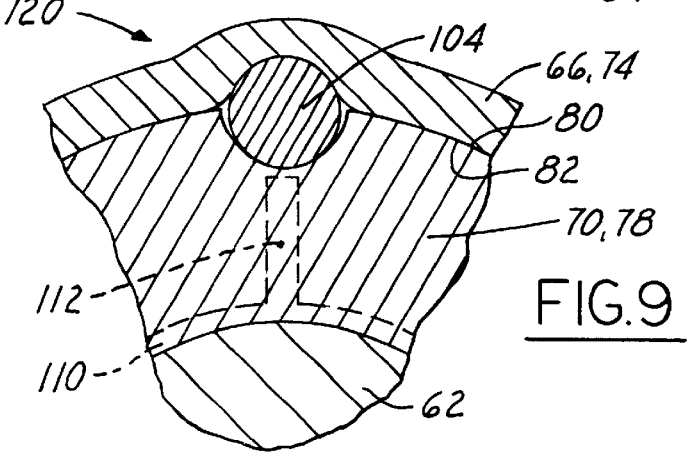
FIG. 9 is a cross sectional view of the telescoping mechanism taken along line 9—9 viewing in the direction of the arrows of FIG. 8.

Referring to FIGS. 8 and 9, the knee bolster system 30 is capable of repeated extending and retracting actuations unless the energy absorber or plowing mechanism 88 has been engaged. Engagement of the plowing mechanism portion 88 will occur when sufficient force is exerted against the front surface of the bolster pad 36 independent of how far it is extended. The necessary force is gauged so that the knees of the occupant 42, 44 experience a force within specified tolerance levels. The plowing mechanism 88 will essentially stop extension or forward movement of the inner tube 70 and permit a limited retraction or rearward movement, thereby creating a cushioning effect. When actuated, and regardless of the rotation of the first or second screw cable 58, 60, the trailing portion 78 is thrust forward relative to the occupant 42, 44 or rearward in relation to the shuttle 62, 64. The lip 108 therefore departs from the leading surface 84 and the contact end surface 94 then impacts the fingers 112. Because the fingers 112 have moved forward within respective crevices 90, the fingers 112 no longer obstruct movement of sphere 104. The retracting movement of the trailing portion 78 of the inner tube 70 causes the sphere 104 to wedge forward or move forward within the groove 96 into the shallow end 102. Since the depth of shallow end 102 is less than the diameter of the sphere 104 the sphere 104 distorts or causes plastic deformation of the outer tube 66 as it plows into the inner face 82. This lateral distortion absorbs the energy of the longitudinally moving inner tube 74. The relative softness between the preferable metals, or alternative plastics, of the outer tube 66, the inner tube 70, and the sphere 104 are selected to minimize reaction forces.

System Logic

The following list provides a brief alphabetical description of terminology's and abbreviations found within FIGS. 10 through 21:

| | |
|---|---|
| ABS: | Anti-lock Braking System |
| ABS = N | Is a logic step wherein the ABS initiated signal is "not set" indicating the ABS has not been in control of the braking function while the vehicle is traveling in excess of 50 km/hr, within the last 10 seconds. |
| ABS = Y | Is a logic step wherein the ABS initiated signal is "set" indicating the ABS has taken over the braking function while the vehicle is traveling at speeds in excess of 50 km/hr within the last 10 seconds. |
| B = N: | Is a logic step wherein the belted signal is not "set" indicating the occupant is not belted. This logic step will trigger a slow extend flag |
| B = Y: | Is a logic step wherein the belted signal is "set" indicating or suggesting the occupant is belted. |
| E/R: | Extendable/Retractable |
| KB: | Knee Bolster |
| E1 = N: | Is a logic step wherein the risk of front impact signal is not "set" indicating the imminence of an impact has not been detected by a mid-range radar system within the last 10 seconds |
| E1 = Y: | Is a logic step wherein the risk of front impact signal is "set" indicating that a mid-range radar has determined sometime within the last 10 seconds that an impact is imminent. |

-continued

| | |
|---|---|
| E2 = N: | Is a logic step wherein the risk of side impact signal is "not set" indicating the imminence of a side impact has not been detected by a side radar system within the last 10 seconds. |
| E2 = Y: | Is a logic step wherein the risk of side impact signal is "set" indicating that a side radar system has determined sometime within the last 10 seconds that a side impact is imminent. |
| E3 = N: | Is a logic step wherein an impact occurrence signal is "not set" indicating a side impact has not been detected within the last 10 seconds. |
| E3 = Y: | Is a logic step wherein an impact occurrence signal is "set" indicating that a side impact has been detected within the last 10 seconds. |
| E4 = N: | Is a logic step wherein a vehicle spin or rollover signal is "not set" indicating a vehicle spin or rollover has not been detected within the last 10 seconds. |
| E4 = Y: | Is a logic step wherein a vehicle spin or rollover signal is "set" indicating a vehicle spin or rollover has been detected within the last 10 seconds. |
| extend flag: | Is a logic signal triggered by a condition or logic step which will cause slow or fast extension of the knee bolster. |
| SIR: | Supplemental inflatable restraint (air bag). |
| T: | Timer, with a duration of ten seconds. |
| T1: | Timer one, with a duration of ten seconds. |
| T2: | Timer two, with a duration of ten seconds. |
| T3: | Timer three, with a duration of three seconds. |
| T5: | Timer five, with a duration of ten seconds. |
| T6: | Timer six, with a duration of ten seconds. |
| T7: | Timer seven, with a duration of ten seconds. |
| V: | Velocity in km/hr |
| VV = Y: | Is a logic step wherein the upper velocity limit is "set." This logic step is initially triggered when the vehicle exceeds 140 km/hr for more than 10 seconds and will cause a slow extend flag to trigger. |
| VSES: | Vehicle Stability Enhancement System, may include but is not necessarily limited to vehicle rollover and yaw rate sensors. |

Figure 10:
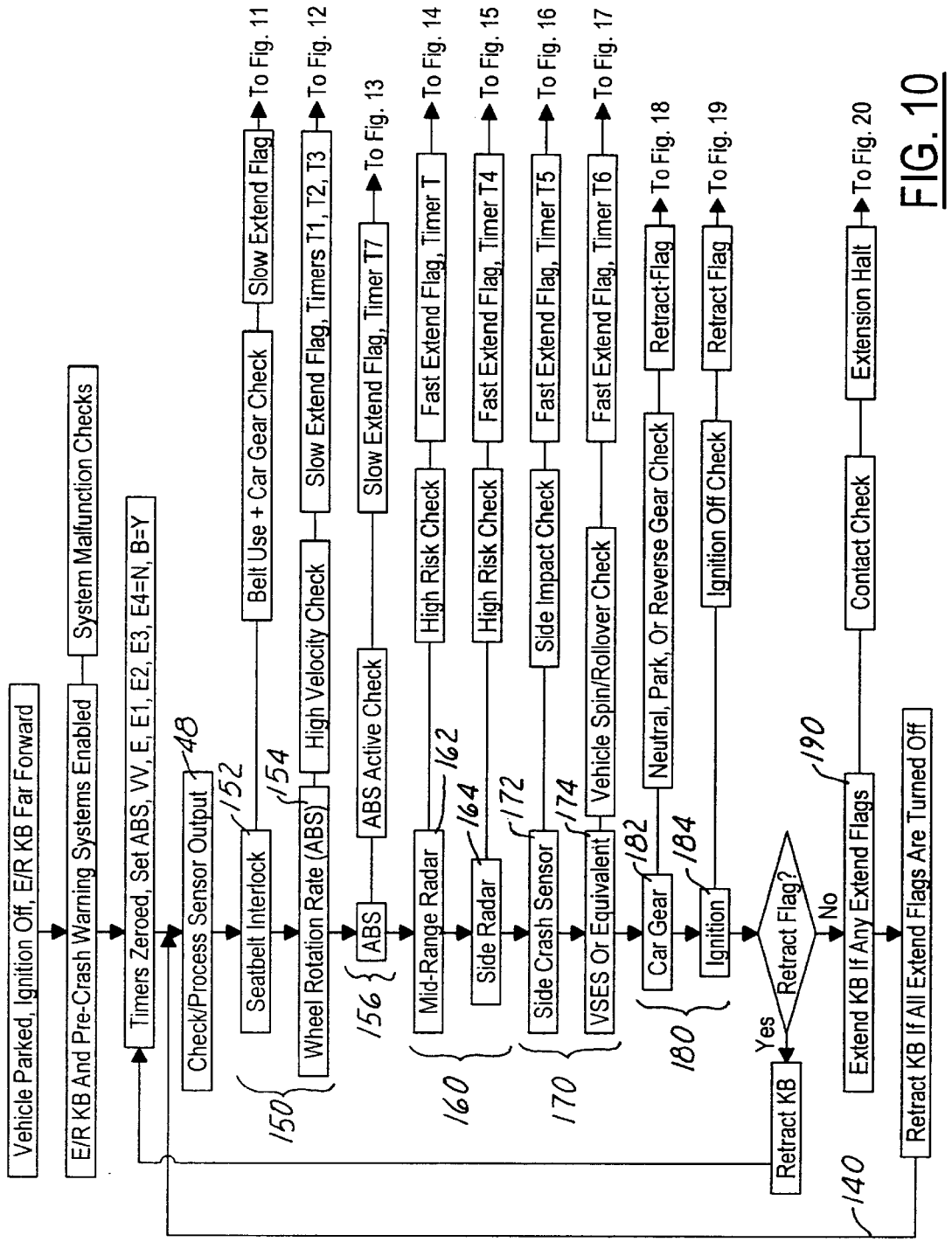
FIG. 10 is a functional flow chart of the knee bolster system control loop.

Referring to FIG. 10, the control system for the knee bolster system 30 will not initiate and therefore the knee bolster pad 36 will not actuate if the ignition is off. Turning the ignition on initiates the knee bolster system 30 which then proceeds to perform a system malfunction check. The timers of a plurality of process sensor outputs 48 are "set" to zero, but not "started" until specifically initiated by a subroutine. Each process sensor output 48 has at least one associated subroutine, the subroutines together comprise the control loop 140. Each subroutine can singularly initiate an extend flag signal which will cause the knee bolster system 30 to extend the knee bolster pad 36. Every subroutine which has initiated an extend flag signal must initiate a retract flag signal before the knee bolster system 30 retracts the knee bolster pad 36 (unless the vehicle is parked, is in neutral or reverse gear, or the ignition is off).

The plurality of process sensor outputs 48, or the control loop 140 may be separated into five categories of outputs. The first category or risk outputs 150 entail sensors which detect vehicle operating conditions that pose a risk should an impact occur, but not necessarily a higher likelihood of a crash. The risk outputs 150 comprise the seatbelt interlock sensor or subroutine 152, see FIG. 11 and the wheel rotation rate/vehicle velocity sensor or subroutine 154, see FIG. 12. The second category is an operating condition that indicates a higher likelihood of an impact. This category is comprised of the ABS sensor or subroutine 156, see FIG. 13. The third category or imminent impact outputs 160 entail sensors which detect that an impact will occur and comprise the mid range radar sensor or subroutine 162, see FIG. 14, and the side radar sensor or subroutine 164, see FIG. 15. The imminent impact outputs 160 rely on the pre-impact sensing system 50 to communicate with the microprocessor 46. The fourth category or impact occurrence outputs 170 entail output sensors which detect an actual impact occurrence (or unstable vehicle control) and comprise a side impact sensor or subroutine 172, see FIG. 16, and a VSES sensor or subroutine 174, see FIG. 17. The risk outputs 150 are assigned "slow" extend flags, and the higher likelihood of an impact, imminent impact and impact occurrence outputs 156, 160, 170 are assigned "fast" extend flags by the microprocessor 46. The fifth category or retract flag outputs 180 function to override existing extend flags from the first four categories which include 150, 156, 160 and 170, if specific conditions are met. The retract flag outputs 180 comprise a vehicle gear sensor or subroutine 182, see FIG. 19 and an ignition sensor or subroutine 184, see FIG. 20. Vehicle gear subroutine 182 overrides any existing extend flags and retracts the knee bolster pad 36 if the vehicle is either shifted into park, neutral or reverse gear. The ignition subroutine 184 overrides any existing extend flags and retracts the knee bolster pad 36 if the vehicle ignition is off.

Figure 11:
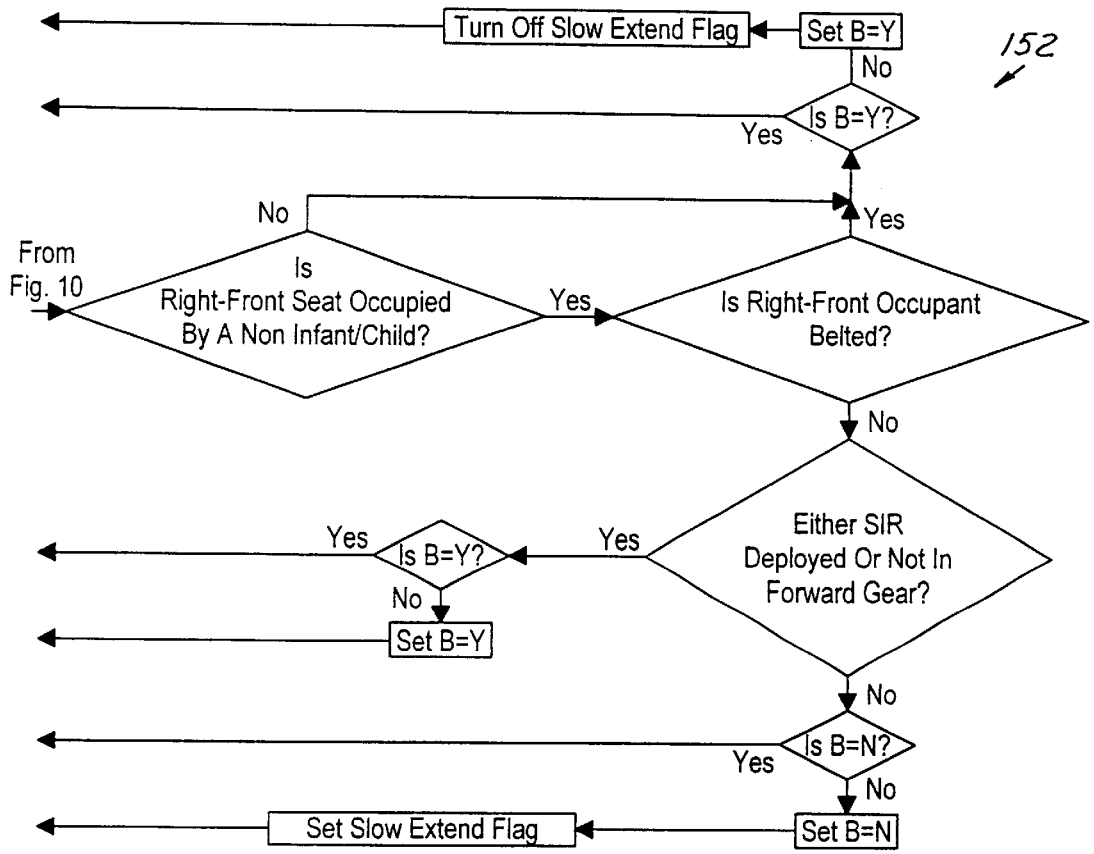
FIG. 11 is a functional flow chart of a seat belt subroutine of FIG. 10.

Referring to FIGS. 10 and 11, the seat belt loop subroutine 152 checks to see if the right front seat is occupied by a full-sized passenger. If so occupied the subroutine checks to see if the right front occupant is belted. If belted, the subroutine 152 acts as it would without a passenger 42 and checks to see if the logic step "B=Y" is set. If set, the pad 36 has not been extended from previous subroutine 152 executions and returns to the loop 140. If not set, the subroutine 152 sets the logic step "B=Y" indicating no passenger 42 or the passenger 42 is belted and turns off the slow extend flag prior to returning to the loop 140.

If the right front seat is occupied by an "adult" and the right front occupant is not belted, and either the SIR is deployed or the vehicle is not in a forward gear, and the logic step "B=Y" is set, the subroutine 152 returns to the loop. If the logic step "B=Y" is not set, the signal is then set and the subroutine 152 returns to the loop 140. This logic assures that the knee bolster pad 36 does not extend after the SIR has been deployed or the vehicle is not in the forward gear. This is so, because if the SIR has already deployed. If the car is in park, a passenger may desire to move about within the vehicle compartment, and an extended pad 36 would get in the way at a time when it is not needed, hence the slow extend flag is not turned on.

If the logic step "B=N" is set indicating the slow extend flag has been turned on in a previous subroutine 152 execution, and, both, the SIR is not deployed and the vehicle is in a forward gear, the subroutine 152 returns to the loop since the knee bolster pad 36 is already extended. If logic step "B=N" is not set, then "B=N" is set and the slow extend flag is turned on since the right front occupant is not belted, the SIR is not deployed, and the vehicle is in a forward gear. If the pad 36 is not yet extended from previous executions, it will extend upon initiation of the slow extend flag from the subroutine 152.

Figure 12:
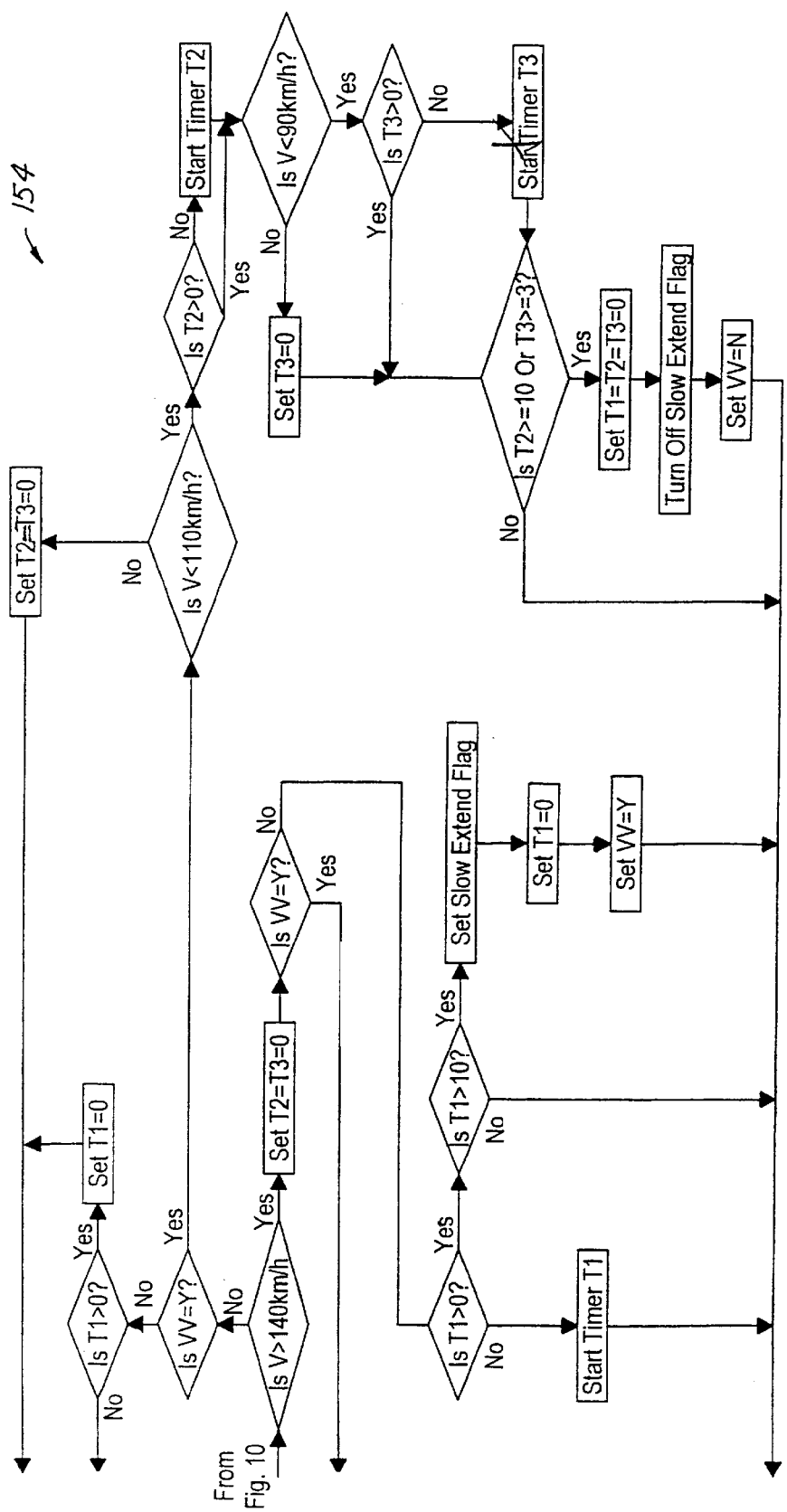
FIG. 12 is a functional flow chart of a vehicle velocity subroutine of FIG. 10.

Referring to FIGS. 10 and 12, the vehicle velocity subroutine 154 first checks to see if the vehicle velocity is greater than approximately one hundred and forty kilometers per hour. If yes, timer T2 and timer T3 are set to zero, the subroutine 154 then checks to see if logic step "VV=Y" is set. If set, this indicates the slow extend flag has been previously executed and the subroutine 154 returns to the loop 140. If "VV=Y" is not set, subroutine 154 checks to see if timer T1 is greater than zero. If no, timer T1 is started and the subroutine 154 returns to the loop 140. The slow extend flag will not be turned on until approximately ten seconds have elapsed with the vehicle traveling over one hundred and forty kilometers per hour. If timer T1 is greater than zero but less than approximately ten seconds, the subroutine 154 again returns to the loop 140. If timer T1 is greater than ten seconds the slow extend flag turns on. Timer T1 is then set back to zero, logic step "VV=Y" is set, indicating the slow extend flag is on, and the subroutine 154 returns to the loop 140.

If the vehicle velocity is not greater than approximately one hundred and forty kilometers per hour the subroutine 154 checks to see if the logic step "VV=Y" is set. If set, the subroutine 154 checks to see if the vehicle velocity is less than approximately one hundred and ten kilometers an hour. If yes, and timer T2 is greater than zero, indicating at the previous subroutine execution(s) the vehicle velocity was also less than one hundred and ten kilometers per hour, the subroutine 154 checks to see if the vehicle velocity is less than approximately ninety kilometers an hour. If timer T2 is not greater than zero, then the vehicle velocity has only recently dropped below one hundred and ten kilometers per hour, and timer T2 is started. After starting or assuring timer T2 has previously been started, the subroutine 154 checks to see if the vehicle velocity is less than approximately ninety kilometers per hour. If yes, and timer T3 is greater than zero indicating the vehicle velocity was less than ninety kilometers per hour at the previous subroutine execution, and timer T2 is greater than approximately ten seconds or timer T3 is greater than approximately three seconds then timer T1, timer T2 and timer T3 are reset to zero and the slow extend flag is turned off. Logic step "VV=N" is set indicating the vehicle velocity has been under the ninety kilometers per hour set point for a prescribed duration of time (i.e. three seconds) or the vehicle velocity has been under the one hundred and ten kilometers per hour set point for a prescribed period of time (i.e. ten seconds) and therefore the extended knee bolster pad 36 should be retracted. The knee bolster pad 36 will retract provided no other extend flags are "on" from the other subroutines. This sort of control logic prevents unnecessary or irritating extending and retracting oscillations of the knee bolster pad 36.

Continuing with subroutine 154 logic, if the vehicle velocity is not less than ninety kilometers per hour but is less than one hundred and ten kilometers per hour then timer T3 is set to zero. Subroutine 154 again checks to see if timer T2 is greater than ten seconds or timer T3 is greater than three seconds. If neither, then the subroutine 154 returns to the loop 140. If one is, then as before, timer T1, timer T2 and timer T3 are set to zero, the slow extend flag is turned off, logic step "VV=N" is set, and the subroutine 154 returns to the loop 140.

If the vehicle velocity is less than ninety kilometers per hour and timer T3 is not greater than zero seconds, indicating the vehicle velocity has recently fallen below ninety kilometers per hour, then timer T3 is started. Subroutine 154 checks to see if timer T2 is greater than ten seconds. If no, then subroutine 160 returns to the loop 140. If yes, timer T1, timer T2 and timer T3 are set to zero, the slow extend flag is turned "off" and logic step "VV=N" is set. The subroutine 154 then returns to the loop 140.

If logic step "VV=Y" is set indicating the slow extend flag has previously been initiated and the vehicle velocity is not less than one hundred and ten kilometers per hour, timer T2 and timer T3 are set to zero. The slow extend flag remains until approximately ten seconds after the vehicle velocity drops below one hundred and ten kilometers per hour, or until approximately three seconds after the vehicle velocity drops below ninety kilometers per hour, which ever occurs sooner. If logic step "VV=Y" is not set and the vehicle speed is less than one hundred and forty kilometers per hour, subroutine 154 checks to see if timer T1 is greater than zero. If "no," then subroutine 154 returns to the loop 140. If "yes," timer T1 is set to zero and subroutine 154, again, returns to the loop 140. In other words, the extend flag has not been previously initiated during prior subroutine executions, nor should it be now since the set point speed has not exceeded one hundred and forty kilometers per hour.

Figure 13:
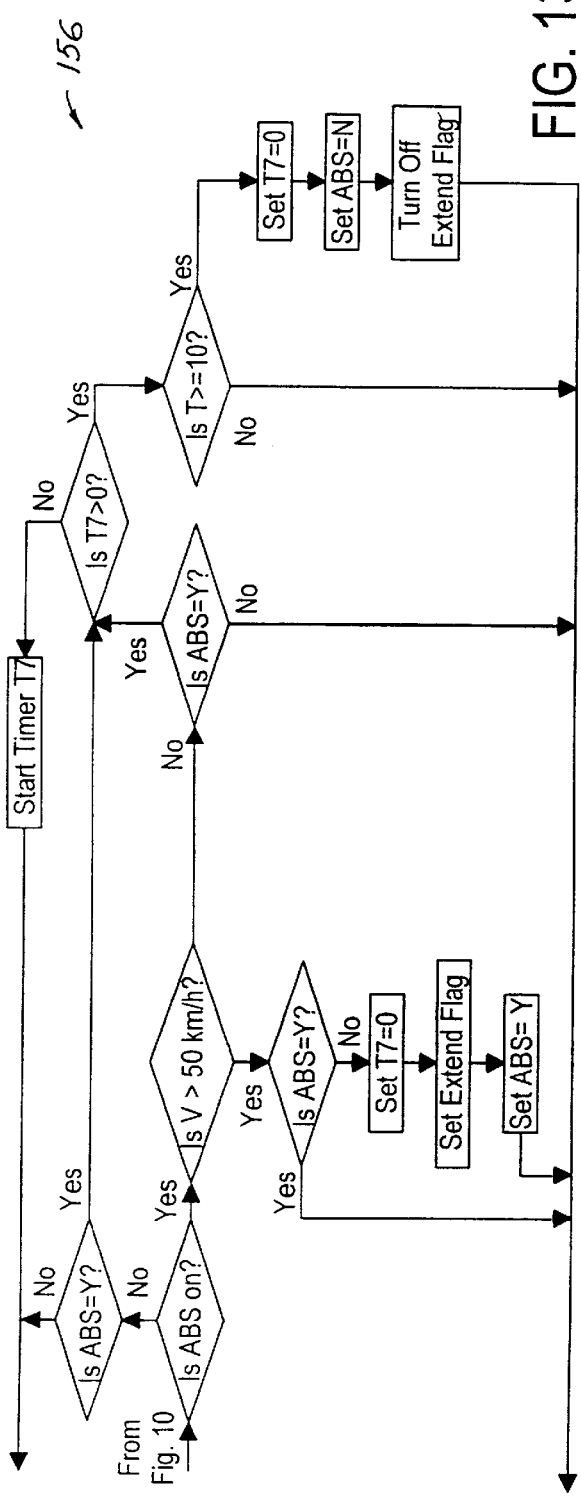
FIG. 13 is a functional flow chart of an antilock braking system subroutine of FIG. 10.
Figure 17:
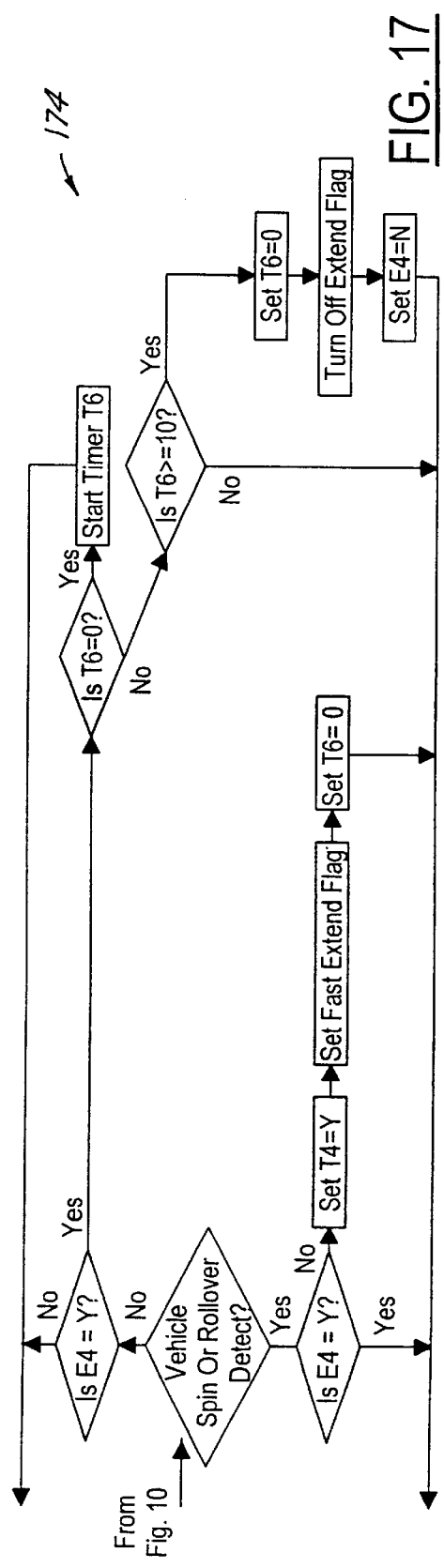
FIG. 17 is a functional flow chart of a vehicle stability enhancement system subroutine of FIG. 10.

Referring to FIGS. 10 and 13, the ABS subroutine 156 will initiate an extend flag if both the ABS is on and the vehicle velocity is over approximately fifty kilometers per hour. Subroutine 156 begins execution by checking to see if the ABS is on. If yes, the subroutine 156 checks to see if the vehicle speed is over approximately fifty kilometers per hour. If yes, and the logic step "ABS=Y" is set, then the subroutine 156 returns to the loop 140 because the extend flag has been previously initiated. If "ABS=Y" is not set, the subroutine 156 sets timer T7 to zero, initiates the extend flag, and sets logic step "ABS=Y."

If the vehicle speed is not over fifty kilometers per hour, and the logic step "ABS=Y" is not set then the subroutine 156 returns to loop 140 and will not initiate the extend flag. If logic step "ABS=Y" is set indicating the extend flag has previously been turned on, yet the ABS is not presently on or the vehicle speed is not over fifty kilometers per hour, and timer T7 is not greater than zero, then timer T7 is started and the subroutine 170 returns to the loop 140. Starting timer T7 begins an approximate ten second countdown prior to turning off the extend flag. If timer T7 is greater than zero, yet less than ten seconds, the countdown was previously started and the subroutine 156 returns to the loop 140. If timer T7 is greater than ten seconds, the countdown has expired, the timer T7 is set to zero, a logic step "ABS=N" is set, and the extend flag is turned off prior to returning to the loop 140.

Figure 14:
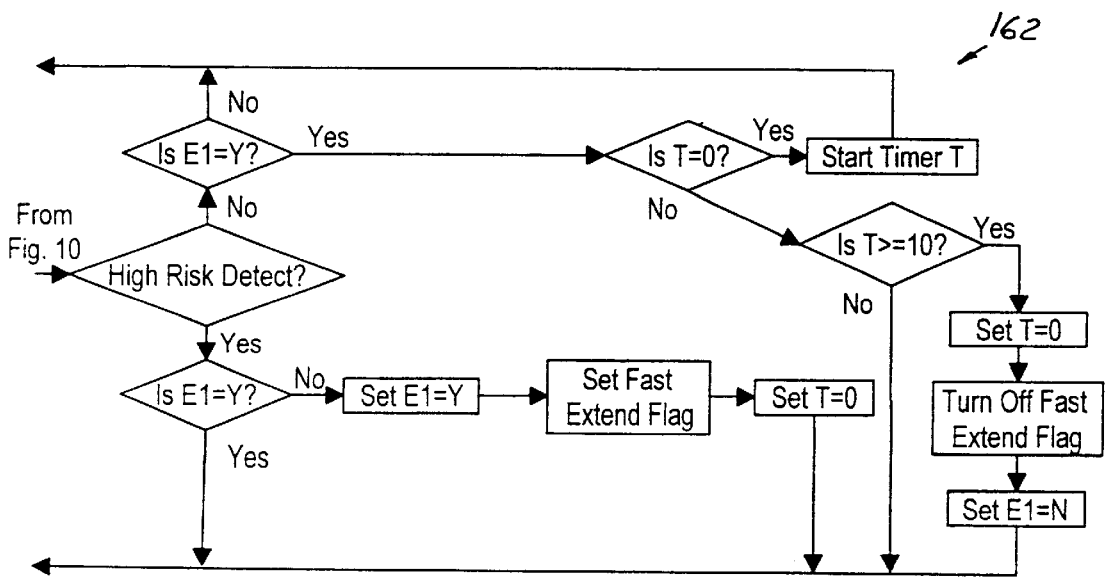
FIG. 14 is a functional flow chart of a mid-range radar subroutine of a crash pre-sensing system found in FIG. 10.

Referring to FIGS. 10 and 14, the pre-impact sensing system 50 mid range radar subroutine 162 checks to see if a risk (imminent impact) has been detected. An affirmative risk detection means that an object has been detected within approximately twenty meters that it is at a sufficiently high relative velocity so that an impact is unavoidable. If yes, the subroutine 162 checks if logic step "E1=Y" has been previously set indicating a fast extend flag has been previously initiated. If set, the subroutine returns to the loop 140. If not set, then logic step "E1=Y" is set, the fast extend flag initiated, and a timer T is set to zero (but not started). This loop indicates that an impact is imminent and the knee bolster system is preparing or actuating in advance.

If a risk has not been detected and logic step "E1=Y" is not set, the subroutine 162 returns to the loop 140. If a risk does not exist, yet logic step "E1=Y" is set and timer T is equal or set to zero, then the timer T is started. This begins a countdown prior to turning off the fast extend flag. If the accumulated time on timer T is greater than ten seconds, the countdown has elapsed and timer T is reset to zero, the fast extend flag is turned off, a logic step "E1=N" is set, and the subroutine 162 returns to the loop 140. The setting of "E1=N" indicates that a risk condition has not been detected for a duration of at least ten seconds. On the other hand, if logic step "E1=Y" is set and the elapsed time on timer T is greater than zero but less than ten seconds the fast extend flag remains on and the subroutine 162 returns to the loop 140.

Referring to FIGS. 10 and 15, the pre-impact sensing system 50 side radar sub-routine 164 routine logic is similar to the mid range radar subroutine 162. The side radar subroutine 164 checks to see if a risk (imminent side impact) has been detected. An affirmative risk detection like the mid range radar means that an object has been detected within approximately 20 meters and at a sufficiently high relative velocity so that a side impact is unavoidable. If yes, the subroutine 164 checks if logic step "E2=Y" has been previously set indicating a fast extend flag has been previously initiated. If set, the subroutine 164 returns to the loop 140. If not set, the logic step "E2=Y" is set, the fast extend flag initiated, and a timer T4 is set to zero but not started. This loop indicates that an impact is imminent from the side and the knee bolster system is preparing or actuating in advance.

If a risk has not been detected and logic step "E2=Y" is not set, the sub-routine 164 returns to the loop 140. If a risk does not exist logic step "E2=Y" is set and timer T4 is equal or set to zero, then the timer T4 is started. This begins the count down toward turning off the fast extend flag. If the accumulated time on timer T4 is greater than ten seconds, the count has elapsed and timer T4 is reset to zero, the fast extend flag is turned off, a logic step "E2=N" is set, and the subroutine 164 returns to the loop 140. Setting "E2=N" indicates that a risk has not been detected for a duration of at least ten seconds. On the other hand, if logic step "E2=Y" is set and a lapse time on timer T4 is greater than zero but less than ten seconds, the fast extend flag remains on and the subroutine 164 returns to the loop 140.

Referring to FIGS. 10 and 16, a side impact subroutine 172 works or flows logically in much the same way as the mid range subroutine 162 or the side radar subroutine 164. The questions of risk detection found in the control logic of subroutines 162 or 164 are replaced with an impact detection check in subroutine 172. Likewise, referring to FIG. 17, a vehicle spin or rollover subroutine 174 is shown. The impact detection check of subroutine 172 is replaced with a vehicle spin or rollover detection check within subroutine 174. Otherwise the control logic steps although independent from one subroutine to the next, are generally the same.

Figure 18:
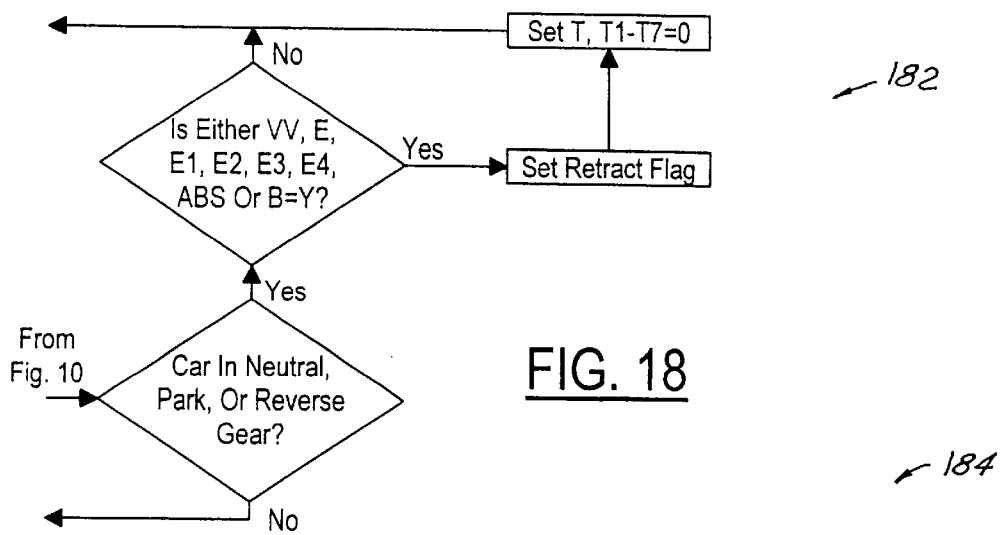
FIG. 18 is a functional flow chart of a car gear check subroutine of FIG. 10.

Referring to FIGS. 10 and 18, a vehicle gear subroutine 182 checks to see if the vehicle transmission is in neutral, park or reverse gear position. If no, subroutine 182 returns to the loop 140. This means that the subroutine 182 will not override any existing extend flags from other subroutines and set an overriding retract flag itself. If the vehicle is in neutral, park or reverse gear position subroutine 182 checks to see if any one or more of the logic steps "VV, E, E1, E2, E3, E4, ABS or B=Y" have been set. If no, the subroutine 182 returns to the loop 140 indicating that no extend flags have been initiated from any of the other subroutines. If yes, the subroutine 182 sets a retract flag. Prior to returning to loop 140 subroutine 182 also sets T and T1 through T7 to zero.

Figure 19:
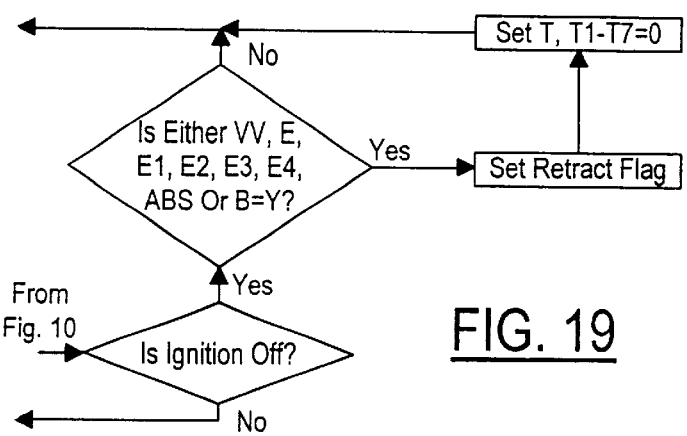
FIG. 19 is a functional flow chart of a car ignition check subroutine of FIG. 10.

Referring to FIGS. 10 and 19, ignition subroutine 184 checks to see if the vehicle ignition is off. If the ignition is not off, the subroutine 184 returns to the loop 140. If the ignition is off, the subroutine reacts the same way as subroutine 182 did when the vehicle was found to be in neutral, park or reverse gear position.

Figure 20:
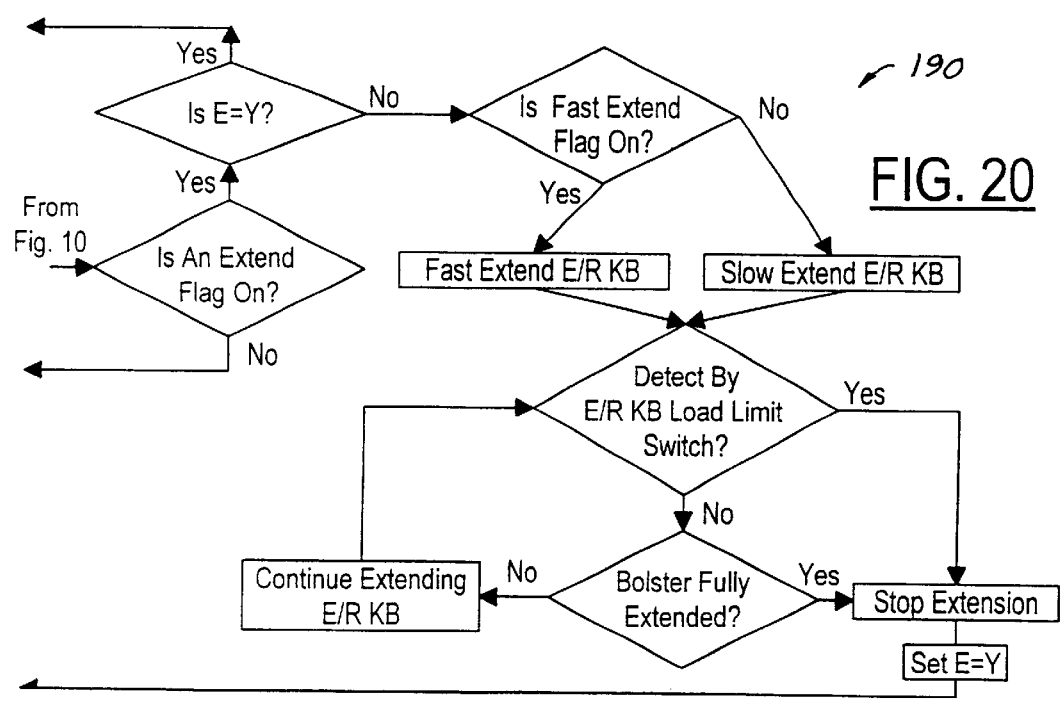
FIG. 20 is a functional flow chart of a knee bolster extension and contact check subroutine of FIG. 10.

Referring to FIGS. 10 and 20, an extend knee bolster subroutine 190 checks to see if an extend flag is on from any one or more of the subroutines 152, 154, 156, 162, 164, 172, 174, 182, and 184. If an extend flag does exist, subroutine 190 checks to see if logic step "E=Y" is set. If yes, sub-routine 190 returns to loop 140. If no, subroutine 190 checks to see if a fast extend flag is on. If yes, the knee bolster pad 36 is extended quickly, if no, the knee bolster pad 36 is extended slowly. During either fast or slow extension, subroutine 190 checks to see if a load set point from a load limit switch has been reached. If no, subroutine 190 checks to see if knee bolster pad 36 is fully extended. Again if no, the bolster pad continues to extend until either the bolster pad 36 is fully extended or the limit switch has detected a load. If a load is detected indicating the pad 36 has contacted the knees of an occupant, the extension is stopped and logic step "E=Y" is set and subroutine 190 returns to the loop 140.

Figure 21:
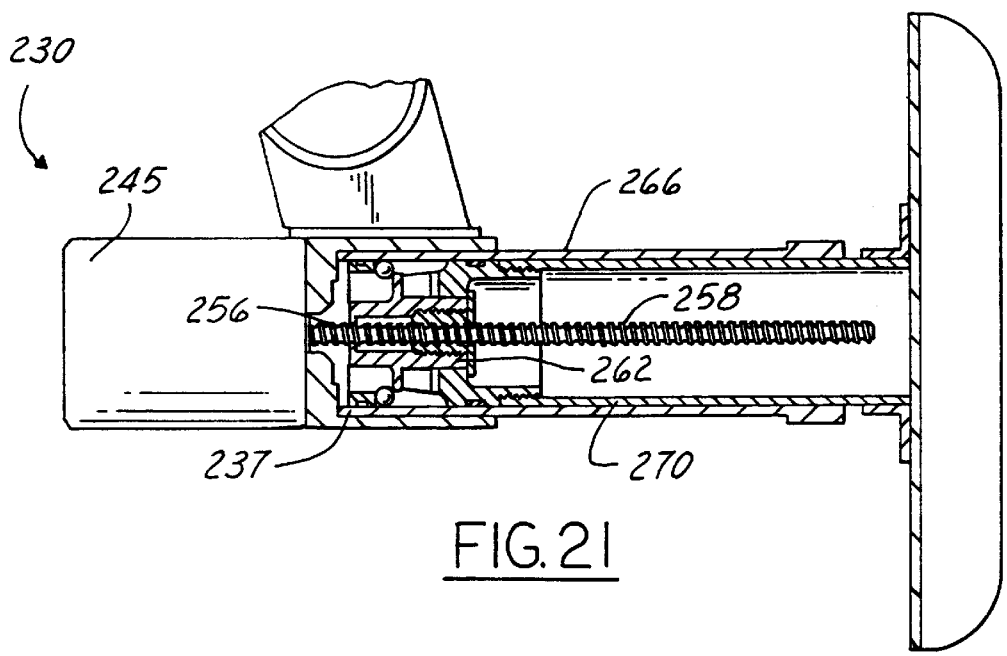
FIG. 21 is a partial cross-sectional longitudinal view of a second embodiment, specifically a directly driven embodiment of the knee bolster system.

Referring to FIG. 21, a second embodiment of the present invention is shown. The drive device 245 mounts rigidly to the base end 237 of the outer tube 266. The drive device 245 is an electric motor having the rotor 256 aligned concentrically to the inner tube 270 and shuttle 262. The rotor 256 engages rigidly and co-linearly to the screw 258. The rotor 256 and the screw 258 can be one straight unitary piece.

Accordingly, it should thus be apparent that there has been provided in accordance with the present invention an extendable and retractable knee bolster system that achieves the aims and advantages specified herein. It will of course be understood that the foregoing description is of preferred exemplary embodiments and that the invention is not limited to the specific embodiments shown. Various changes and modifications will become apparent to those skilled in the art. For example, although the actuator 43 includes an electric motor for a drive device 44, the actuator may also be a pneumatic actuated cylinder or a rod which extends electro-magnetically. As another example, means other than the ball and shuttle mechanism could be used for locking the stroking elements and generating a stroking/crushing force under knee loading in a vehicle impact. One alternative means would be to use a rachet-type mechanism operative on extension and released upon retraction. A second alternative means would be to use an MRF (magnetorheological fluid) damper as the stroking element. In an MRF damper, stroking force is proportional to the applied current. In this application the applied current would be set to zero when extending and retracting and switched to an appropriate high level consistent with the desired stroking force during knee loading associated with an impact event. It can also be appreciated that the time delays, velocity setpoints and distance setpoints found within the various subroutines may be substantially altered and are for example purposes only in order to describe the logic flow of various subroutines. All such changes and modifications are intended to come within the scope of the appended claims.

What is claimed is:

1. A knee bolster system for a vehicle comprising:

a vehicle structure;

a first telescoping mechanism and a second telescoping mechanism, each telescoping mechanism having:
   an outer tube having a base end, a free end and an inner cylindrical wall, the base end engaged rigidly to the vehicle structure, the inner cylindrical wall extending between the base and free ends, and
   an inner tube supported concentrically within the outer tube, the inner tube having a leading end, a trailing portion, and an outer cylindrical wall facing the inner cylindrical wall of the outer tube, the inner tube capable of linear translation through the free end of the outer tube;

a knee bolster pad attached rigidly to the free ends of the first and second telescoping mechanisms;

an actuator interconnected to the vehicle structure and operative to move the inner tubes of the first and second telescoping mechanisms between a retracted position and an extended position, the actuator having:
   a first screw disposed concentrically within the first telescoping mechanism,
   a second screw disposed concentrically within the second telescoping mechanism,
   a first shuttle engaged to and disposed concentrically and radially inward from the trailing portion of the inner tube of the first telescoping mechanism, the first shuttle engaged threadably to the first screw, and
   a second shuttle engaged to and disposed concentrically and radially inward from the trailing portion of the inner tube of the second telescoping mechanism, the second shuttle engaged threadably to the second screw;

at least one drive device engaged to one end of the first and second screw, the drive device for rotating the first and second screws causing uniform linear translation of the first and second shuttles in the same direction;

two plowing mechanisms, the first plowing mechanism disposed within the first telescoping mechanism and the second plowing mechanism disposed within the second telescoping mechanism, a portion of each plowing mechanism operative to limit the linear translation of the first and second telescoping mechanisms in response to a forward force from an occupant of the vehicle;

a microprocessor capable of receiving electrical signal inputs from a plurality of sensor outputs and processing extend and retract flags to electrically control the drive device; and wherein the drive device is a singular electric motor having a dual ended rotor, the first screw being flexible is engaged to one end of the rotor and the second screw being flexible is engaged to the other end of the rotor, the first screw counter threaded with respect to the second screw.

2. A knee bolster system as set forth in claim 1 further comprising:

the trailing portion of the inner tube having a shoulder extending radially inward and axially defined between a contact end surface and a leading surface of the trailing portion; and the shuttle having a forward stop member, a mid portion, and a rearward stop member, the mid portion extending between and radially inward of the forward and rearward stop members, the mid portion engaged slideably to the shoulder, the forward stop member contacting the leading surface of the shoulder when the actuator is in a retracting state, the rearward stop member contacting the contact end surface of the shoulder when the actuator is in an extending state.

3. A knee bolster system as set forth in claim 2 wherein the plowing mechanism further comprises:

at least one wedge-shaped groove defined by the outer cylindrical wall of the inner tube, the at least one wedge shaped groove having a deep end and a shallow end, the shallow end disposed axially forward of the deep end;

a sphere disposed within each one of the respective grooves, the sphere having a diameter slightly less than the depth of the deep end of the groove and greater than the depth of the shallow end of the groove; and at least one finger engaged rigidly with and extending radially outward from the rearward stop member of the shuttle, each one of the at least one finger penetrating into the deep end of the respective groove, each finger disposed axially between the sphere and the shallow end of the groove during the extending and retracting states, and whereupon an impact force is exerted on the knee bolster pad, the trailing portion of the inner tube is pushed rearward with respect to the shuttle, each finger aligning axially to the shallow end of each groove and is disposed radially inward of each respective groove, the sphere thereby being wedged against the inner wall of the outer tube in response to linear translation of the inner tube from the extended position of the knee bolster pad toward the retracted position.

4. A knee bolster system as set forth in claim 3 wherein each one of the at least one plowing mechanism further comprise at least one crevice extending axially and communicating radially through the trailing portion of the inner tube into each respective one of the at least one groove, each one of the at least one finger protruding laterally through each respective one of the at least one crevice.

5. A knee bolster system as set forth in claim 4 comprising:

a plurality of high risk sensors electrically communicating with the microprocessor, the plurality of high risk sensors having a seatbelt interlock sensor, a vehicle velocity sensor;

an Anti-lock Braking System (ABS) sensor electrically communicating with the microprocessor; and a plurality of crash occurrence sensors electrically communicating with the microprocessor, the plurality of crash occurrence sensors having a side crash sensor and a Vehicle Stability Enhancement System (VSES) sensor.

6. A knee bolster system as set forth in claim 5 further comprising a plurality of retract flag sensors electrically communicating with the microprocessor, the retract flag sensors having a vehicle gear sensor and an ignition sensor.

7. A knee bolster system as set forth in claim 6 further comprising:

a pre-impact sensing system electrically communicating with the microprocessor; and a plurality of imminent impact sensors electrically communicating with the pre-impact sensing system, the plurality of imminent impact sensors having a mid range radar sensor and a side radar sensor.

8. A knee bolster system for a vehicle comprising:

a vehicle structure;

at least one telescoping mechanism having a base end and a free end, the base end engaged to the vehicle structure, the free end capable of linear translation with respect to the base end;

a knee bolster pad attached rigidly to each free end of the at least one telescoping mechanism;

at least one actuator secured to the base end of the respective one of the at least one telescoping mechanism, the actuator operative to move the telescoping mechanism between a retracted position and an extended position, the at least one actuator having:
  a shuttle disposed operatively and interconnected to the free end of the telescoping mechanism, and
  a drive device interconnected to the shuttle and operative to effect back and forth linear translation of the shuttle;

at least one plowing mechanism operative to limit the linear translation of the at least one telescoping mechanism in response to a forward force from an occupant of the vehicle during a crash;

a microprocessor capable of receiving electrical signal inputs from a plurality of sensor outputs and processing extend and retract flags to electrically control the drive device;

an inner tube having a leading end, a trailing portion, and an outer cylindrical wall;

an outer tube engaged rigidly to the vehicle structure and disposed concentrically with the inner tube, the outer tube having the base end, a free end and an inner cylindrical wall, the outer cylindrical wall of the inner tube facing the inner cylindrical wall, the inner tube supported within the outer tube, and the inner tube capable of linear translation through the free end of the outer tube;

the trailing portion of the inner tube having a shoulder extending radially inward and axially defined between a contact end surface and a leading surface of the trailing portion; and the shuttle having a forward stop member, a mid portion, and a rearward stop member, the mid portion extending between and radially inward of the forward and rearward stop members, the mid portion engaged slideably to the shoulder, the forward stop member contacting the leading surface of the shoulder when the actuator is in a retracting state, the rearward stop member contacting the contact end surface of the shoulder when the actuator is in an extending state.

9. A knee bolster system as set forth in claim 8 wherein each one of the at least one plowing mechanism further comprise:
  at least one wedge-shaped groove defined by the outer cylindrical wall of the inner tube, the at least one wedge-shaped groove having a deep end and a shallow end, the shallow end disposed axially forward of the deep end;
  a sphere disposed within each one of the respective grooves, the sphere having a diameter slightly less than the depth of the deep end of the groove and greater than the depth of the shallow end of the groove; and
  at least one finger engaged rigidly with and extending radially outward from the rearward stop member of the shuttle, each one of the at least one finger penetrating into the deep end of the respective groove, each finger disposed axially between the sphere and the shallow end of the groove during the extending and retracting states, and whereupon an impact force is exerted on the knee bolster pad, the trailing portion of the inner tube is pushed rearward with respect to the shuttle, each finger aligning axially to the shallow end of each groove and is disposed radially inward of each respective groove, the sphere thereby being wedged against the inner wall of the outer tube in response to linear translation of the inner tube from the extended position of the knee bolster pad toward the retracted position.

10. A knee bolster system as set forth in claim 9 wherein each one of the at least one plowing mechanisms further comprise at least one crevice extending axially and communicating radially through the trailing portion of the inner tube into each respective one of the at least one groove, each one of the at least one finger protruding laterally through each respective one of the at least one crevice.

11. A knee bolster system as set forth in claim 10 wherein the actuator further comprises:
  the drive device being an electric motor engaged rigidly to the base end of the outer tube, the motor having a rotor aligned concentrically with the shuttle; and
  a screw engaged rigidly and colinearly with the rotor at one end, the screw engaged threadably through the shuttle.

12. A knee bolster system as set forth in claim 10 further comprising:
  the at least one telescoping mechanism having a first telescoping mechanism and a second telescoping mechanism;
  the drive device being an electric motor mounted rigidly to the vehicle structure, the motor having a dual rotor; and
  the at least one actuator having a flexible first screw cable engaged threadably to a first shuttle within the first telescoping mechanism and a flexible second screw cable engaged threadably to a second shuttle within the second telescoping mechanism, the first screw cable counter threaded with respect to the second screw cable, the first screw cable engaged rigidly to a first end of the rotor and a second screw cable engaged rigidly to a second end of the rotor.

13. A knee bolster system as set forth in claim 12 further comprising:
  a plurality of high risk sensors electrically communicating with the microprocessor, the plurality of high risk sensors having a seatbelt interlock sensor, a vehicle velocity sensor;
  an Anti-lock Braking System (ABS) sensor electrically communicating with the microprocessor; and
  a plurality of crash occurrence sensors electrically communicating with the microprocessor, the plurality of crash occurrence sensors having a side crash sensor and a Vehicle Stability Enhancement System (VSES) sensor.

14. A knee bolster system as set forth in claim 13 further comprising a plurality of retract flag sensors electrically communicating with the microprocessor, the retract flag sensors having a vehicle gear sensor and an ignition sensor.

15. A knee bolster system as set forth in claim 14 further comprising:
- a pre-impact sensing system electrically communicating with the microprocessor; and
- a plurality of imminent impact sensors electrically communicating with the pre-impact sensing system, the plurality of imminent impact sensors having mid range radar sensor and a side radar sensor.

16. A method of extending and retracting a knee bolster pad comprising the steps of:
- turning a vehicle ignition switch on;
- performing a pre-impact warning system check;
- performing a knee bolster system check;
- activating the impact pre-sensing warning system;
- activating the knee bolster system;
- initiating search mode to detect extend flag signals from a plurality of sensor outputs;
- checking for an overriding retract flag, if detected, retracting a knee bolster pad if extended regardless of existing extend flags;
- extending a knee bolster pad if no overriding retract flags exist, the knee bolster pad is not already extended, and an extend flag exists caused by any one of the plurality of sensors;
- detecting a retract flag from all of the plurality of sensors; and
- retracting the knee bolster pad if extended.

* * * * *